(12) United States Patent
Luther et al.

(10) Patent No.: US 6,305,850 B1
(45) Date of Patent: Oct. 23, 2001

(54) MULTIFIBER ALIGNMENT ADAPTER AND ASSOCIATED FIBER OPTIC CONNECTOR SUBASSEMBLY

(75) Inventors: James P. Luther; Karl M. Wagner, both of Hickory, NC (US)

(73) Assignee: Corning Cable Systems LLC, Hickory, NC (US)

(*) Notice: Subject to any disclaimer, the term of this patent is extended or adjusted under 35 U.S.C. 154(b) by 0 days.

(21) Appl. No.: 09/224,679

(22) Filed: Dec. 31, 1998

(51) Int. Cl.⁷ ........................................................ G02B 6/36
(52) U.S. Cl. .................................................................. 385/78
(58) Field of Search .................................. 385/78, 83, 84

(56) References Cited

U.S. PATENT DOCUMENTS

| | | | |
|---|---|---|---|
| 5,341,447 | * 8/1994 | Edwards et al. | 385/81 |
| 5,381,500 | * 1/1995 | Edwards et al. | 385/78 |
| 5,402,512 | 3/1995 | Jennings et al. | 385/46 |
| 5,592,323 | 1/1997 | Wolter et al. | 359/188 |
| 5,619,605 | 4/1997 | Ueda et al. | 385/80 |
| 5,727,101 | 3/1998 | Giebel et al. | 385/59 |
| 5,815,621 | 9/1998 | Sakai et al. | 385/80 |
| 5,896,479 | * 4/1999 | Vladic | 385/59 |
| 6,089,759 | * 7/2000 | Kawamura et al. | 385/78 |

FOREIGN PATENT DOCUMENTS

| | | | |
|---|---|---|---|
| 0459776A2 | 12/1991 | (EP) | G02B/26/02 |
| 0601558A1 | 6/1994 | (EP) | G02B/6/38 |
| 2050714 | 1/1981 | (GB) . | |

OTHER PUBLICATIONS

Patent Abstract of Japan, 58118614, Jun. 14, 1983.
Patent Abstract of Japan, 58088711, May 26, 1983.

* cited by examiner

Primary Examiner—Frank G. Font
Assistant Examiner—Michael P. Stafira

(57) ABSTRACT

A multifiber connector subassembly is provided that includes a ferrule and a multifiber alignment adapter for individually guiding the plurality of individual optical fibers into alignment with respective ones of the bores or microholes defined by the ferrule. In this regard, the ferrule includes a forward portion that defines the plurality of bores for receiving respective end portions of a plurality of optical fibers and a rear portion that defines an opening of a predetermined shape. The multifiber alignment adapter defines a plurality of lengthwise extending passageways for receiving respective ones of the plurality of optical fibers. The multifiber alignment adapter also has a forward end having an exterior shape that corresponds to the predetermined shape of the opening defined by the rear portion of the ferrule. As such, the forward end of the multifiber alignment adapter can be positioned within the opening defined by the rear portion of the ferrule such that each passageway defined by the multifiber alignment adapter is aligned with a respective bore defined by the ferrule. Accordingly, the multifiber connector subassembly can guide each individual optical fiber through a passageway and into the respective bore defined by the ferrule without being stubbed or otherwise damaged and without requiring that the optical fibers be ribbonized.

19 Claims, 6 Drawing Sheets

MULTIFIBER ALIGNMENT ADAPTER AND ASSOCIATED FIBER OPTIC CONNECTOR SUBASSEMBLY

FIELD OF THE INVENTION

The present invention relates generally to multifiber connectors and, more particularly, to the alignment and insertion of a plurality of optical fibers into a multifiber ferrule.

BACKGROUND OF THE INVENTION

Multifiber cables are being increasingly employed in a wide variety of applications. As such, multifiber connectors must frequently be mounted upon the end portion of a multifiber cable in order to facilitate connection of the cable with another multifiber cable or with any of a variety of optical devices. Typically, the multifiber cables are ribbonized such that the plurality of optical fibers are maintained in a side-by-side relationship by a matrix material.

Multifiber connectors generally include a multifiber ferrule, such as a DC ferrule or an MT ferrule, that define a relatively large opening proximate the rear end of the ferrule for receiving the multifiber ribbon. Conventional multifiber ferrules also define a plurality of bores or microholes proximate the forward end of the ferrule for receiving individual ones of the optical fibers of the multifiber ribbon. In order to feed or guide the optical fibers into the respective bores, the lateral cross-sectional size of the opening proximate the rear end of the ferrule is typically reduced as the opening advances from the rear end of the ferrule into medial portions of the ferrule. As such, the opening serves to guide a multifiber ribbon through the ferrule and into general alignment with the plurality of bores defined by the forward end of the ferrule. While the opening is effective for guiding a multifiber ribbon, the opening does not provide much, if any, guidance for individual ones of the optical fibers.

Typically, the spacing between the bores defined by a multifiber ferrule and the spacing between the optical fibers of a multifiber ribbon are approximately equal. As such, even though the matrix material has been stripped from the end portions of the optical fibers prior to inserting the multifiber ribbon into the opening defined by the rear portion of the ferrule, the multifiber ribbon will maintain the spacing of the end portions of the optical fibers. Thus, the end portions of the optical fibers of the multifiber ribbon can be inserted into respective bores defined by the ferrule once the multifiber ribbon has been guided into general alignment with the plurality of bores by the opening defined by the rear portion of the ferrule.

Multifiber connectors can also include a lead-in tube to guide the multifiber ribbon into the opening defined by the rear portion of the ferrule. Typically, the lead-in tube is a cylindrical tube that serves to guide the multifiber ribbon as a whole and not individual ones of the optical fibers. As such, a conventional lead-in tube guides the multifiber ribbon into the opening defined by the rear portion of the multifiber ferrule, but does not further guide the optical fibers through the ferrule and into the respective bores defined by the forward portion of the ferrule.

While conventional multifiber ferrules and their associated lead-in tubes provide sufficient guidance for the optical fibers of a multifiber ribbon due to the correspondence between the spacing of the optical fibers of a multifiber ribbon and the spacing of the openings defined by the forward portion of the ferrule, problems arise in instances in which a multifiber ferrule is to be mounted upon the end portions of a plurality of loose optical fibers, i.e., a plurality of nonribbonized optical fibers. In this instance, a technician could attempt to individually insert the end portion of each optical fiber through the opening defined by the rear portion of the multifiber ferrule and into the respective bore defined by the forward portion of the multifiber ferrule. As will be apparent, the extremely small size of the multifiber ferrule and the optical fibers would make this insertion process extremely tedious and quite time consuming. In addition, attempts to insert an individual optical fiber into a respective bore defined by the forward portion of a ferrule may fail to appropriately align the end portion of the optical fiber with the respective bore such that the end portion of the optical fiber would be stubbed into ferrule, thereby possibly damaging the optical fiber.

Accordingly, a technician generally forms the plurality of loose optical fibers into a ribbon format in order to mount a multifiber ferrule upon the end portions of a plurality of loose optical fibers. For example, end portions of the plurality of optical fibers can be inserted into a fixture that establishes a desired spacing between the optical fibers. A tape, such as a KAPTON™ tape, can then be wrapped about the plurality of optical fibers in order to secure the end portions of the optical fibers in a ribbonized format having the desired spacing. Thereafter, a multifiber ferrule can be mounted on the end portions of the plurality of optical fibers that have been bound together by tape. While this ribbonization of a plurality of otherwise loose optical fibers facilitates the mounting of a multifiber ferrule upon the end portions of the optical fibers, the ribbonization of the plurality of loose optical fibers is somewhat time consuming. In addition, this technique for ribbonizing a plurality of loose optical fibers generally requires a specialized fixture for receiving the end portions of the optical fibers and for establishing the spacing therebetween. While techniques have therefore been developed to mount multifiber ferrules upon the end portions of a plurality of loose optical fibers, a need still exists for improved techniques for mounting multifiber ferrules upon the end portions of a plurality of loose optical fibers in a rapid manner without damaging the optical fibers.

SUMMARY OF THE INVENTION

A multifiber connector subassembly is therefore provided that includes a ferrule and a multifiber alignment adapter for individually guiding the plurality of individual optical fibers into alignment with respective ones of the bores or microholes defined by the ferrule. In this regard, the ferrule includes a forward portion that defines the plurality of bores for receiving respective end portions of a plurality of optical fibers. The ferrule also generally includes a rear portion defining an opening of a predetermined shape. According to the present invention, the multifiber alignment adapter defines a plurality of lengthwise extending passageways for receiving respective ones of the plurality of optical fibers. The multifiber alignment adapter also has a forward end having an exterior shape that corresponds to the predetermined shape of the opening defined by the rear portion of the ferrule. As such, the forward end of the multifiber alignment adapter can be positioned within the opening defined by the rear portion of the ferrule such that each passageway defined by the multifiber alignment adapter is aligned with a respective bore defined by the ferrule. Accordingly, the multifiber connector subassembly of the present invention can guide each individual optical fiber through a passageway and into the respective bore defined by the ferrule without being stubbed or otherwise damaged.

Each bore defined by the ferrule has a lengthwise extending axis. Likewise, each passageway defined by the multifiber alignment adapter has a lengthwise extending axis. Accordingly, the forward end of the multifiber alignment adapter is preferably positioned within the opening defined by the rear portion of the ferrule such that the lengthwise extending axis of each passageway of the multifiber alignment adapter extends collinearly with the lengthwise extending axis of the respective bore defined by the ferrule.

The multifiber alignment adapter of the present invention includes an adapter body extending lengthwise between opposed forward and rear ends. The adapter body defines the plurality of passageways which, in one advantageous embodiment, are a plurality of lengthwise extending grooves. While the adapter body need only define grooves along a portion of its length, the adapter body of one embodiment defines a plurality of grooves that extend lengthwise between the forward and rear ends of the adapter body. While the grooves can be configured in a variety of manners, the grooves defined by the adapter body of one advantageous embodiment open outwardly through opposed lateral sides of the adapter body.

In addition to defining the plurality of passageways, such as the plurality of grooves, the adapter body has an exterior surface that may have a stepped configuration. In this embodiment, the forward portion of the adapter body will be smaller in lateral cross-section than the rear portion of the adapter body. In addition, at least the forward end of the adapter body is preferably shaped to correspond to the opening defined by the rear portion of the ferrule such that the forward end of the adapter body can be snugly inserted into the opening defined by the ferrule in order to appropriately align the passageways defined by the alignment body with respective bores defined by the forward portion of the ferrule. For example, the forward end of the adapter body can be beveled to facilitate insertion of the forward end of the adapter body into an opening defined by the ferrule that is correspondingly beveled.

In one advantageous embodiment, the adapter body includes a forward portion that defines a plurality of lengthwise extending bores that can be aligned with respective bores defined by the forward portion of the ferrule. The adapter body of this embodiment also includes an elongate rear portion that serves as a handle during the insertion of the forward end of the adapter body into the opening defined by the rear portion of the ferrule. While not necessary for the practice of the present invention, the rear portion of the adapter body can define a plurality of lengthwise extending grooves that are aligned with respective bores defined by the forward portion of the adapter body. As such, an optical fiber can be guided by a groove into the respective bore defined by the forward portion of the adapter body and, in turn, into a respective bore defined by the ferrule once the forward end of the adapter body has been inserted into the opening defined by the rear portion of the ferrule. In this regard, the forward portion of the adapter body of one embodiment has a generally rectangular shape in lateral cross-section to thereby facilitate insertion of the forward end of the adapter body into an opening defined by the ferrule that also has a generally rectangular shape.

While the multifiber alignment adapter advantageously aligns end portions of a plurality of optical fibers with respective bores defined by the ferrule, a multifiber ferrule is also provided according to one aspect of the present invention that is internally configured to guide the end portions of the optical fibers lengthwise through the ferrule and into respective bores defined by the forward portion of the ferrule. In this embodiment, the multifiber ferrule includes a ferrule body extending lengthwise between opposed forward and rear ends. The ferrule body defines a plurality of bores for receiving respective end portions of a plurality of optical fibers. According to this embodiment, at least a portion of each bore is smoothly tapered such that the dimensions of the tapered portion decrease in a direction extending from the rear end of the ferrule body toward the forward end of the ferrule body. Each bore defined by the ferrule body also includes a first cylindrical portion extending from the forward end of the ferrule body to the tapered portion. As such, the tapered portion tapers inwardly in a forwardly extending direction to a lateral cross-sectional size that matches the lateral cross-sectional size of the first cylindrical portion. Accordingly, the tapered portion of each bore can guide the end portion of the respective optical fiber through the bore and into the first cylindrical portion as the optical fiber is advanced toward the forward end of the ferrule body.

Each bore defined by the ferrule body of this embodiment can also include a second cylindrical portion extending rearwardly from the tapered portion. As such, the tapered portion of each bore defined by the ferrule body of this embodiment tapers outwardly in a rearwardly extending direction to a lateral cross-sectional size that matches the lateral cross-sectional size of the second cylindrical portion. Accordingly, the second cylindrical portion is larger in lateral cross-section than the first cylindrical portion such that the end portion of an optical fiber can be initially received within the larger second cylindrical portion of the bore and thereafter guided by the tapered section into the smaller first cylindrical portion of the bore such that the end portion of the optical fiber can be appropriately positioned at the forward end of the ferrule body. While the ferrule body can define the plurality of bores to extend between the opposed forward and rear ends, the ferrule body can, instead, define a common opening proximate the rear end of the ferrule body into which each of the bores open. As such, each of the plurality of optical fibers can be inserted into the common opening defined by the rear portion of the ferrule body and thereafter further inserted into respective bores defined by the forward portion of the ferrule body.

Accordingly, the multifiber connector subassembly, the multifiber alignment adapter and the multifiber ferrule of the present invention facilitate insertion of a plurality of loose optical fibers into respective bores defined by the forward portion of the ferrule in an efficient manner without requiring that the optical fibers be ribbonized. As such, the multifiber connector subassembly, the multifiber alignment adapter and the multifiber ferrule of the present invention reduce fiber stubbing that could possibly damage the optical fibers.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figures 1, 2:
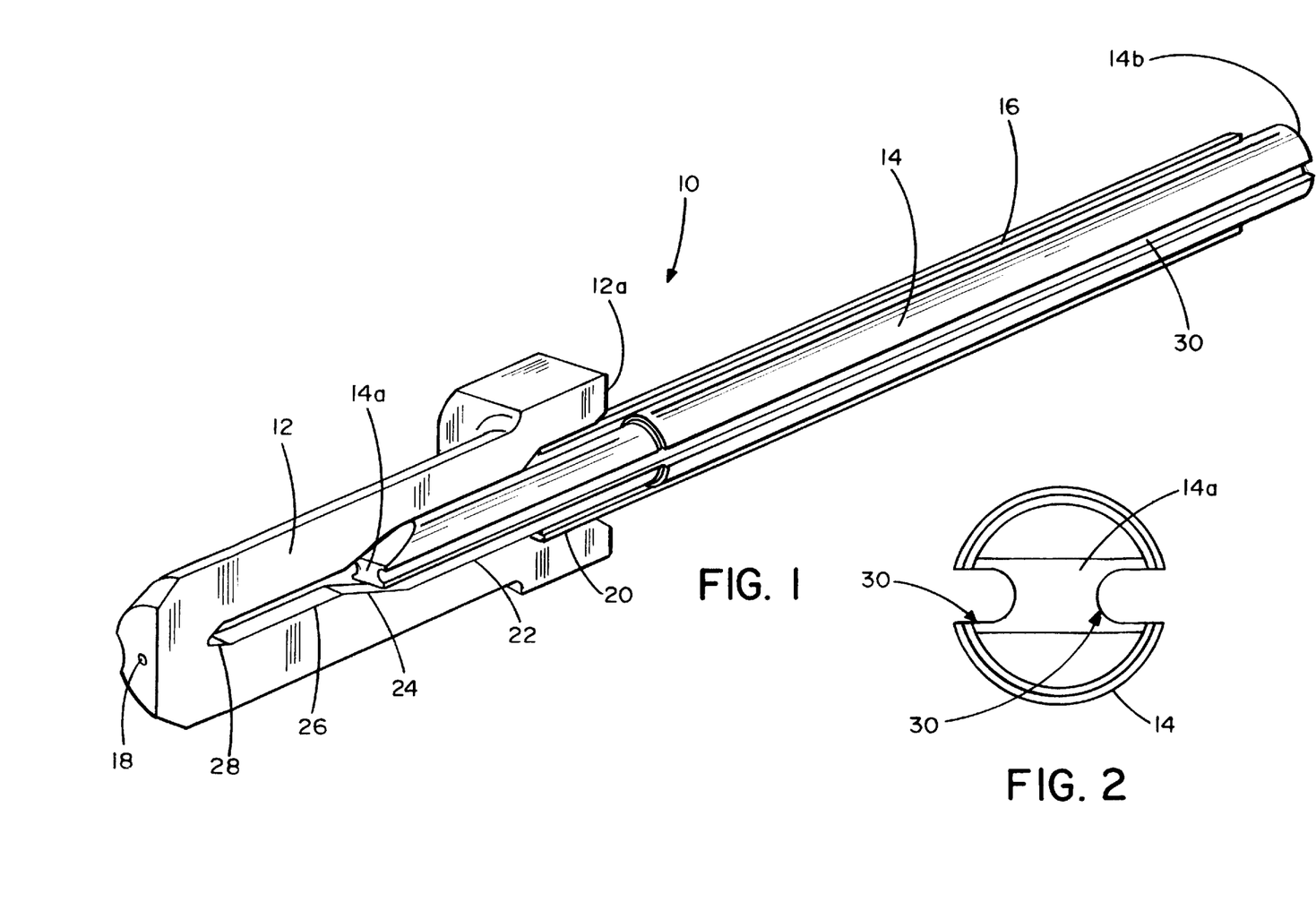
FIG. 1 is a perspective view of a multifiber connector subassembly according to one embodiment of the present invention in which portions of the multifiber ferrule and the lead-in tube have been removed for purposes of more clearly illustrating the multifiber alignment adapter.
FIG. 2 is an end view of a multifiber alignment adapter of FIG. 1 taken from the forward end of the multifiber alignment adapter.

Referring now to FIG. 1, a multifiber connector subassembly 10 according to one embodiment of the present invention is illustrated. The multifiber connector subassembly of this embodiment includes a multifiber ferrule 12 and a multifiber alignment adapter 14. As shown in FIG. 1, the multifiber connector subassembly can also include a cylindrical lead-in tube 16 through which the multifiber alignment adapter extends. Although not illustrated, the multifiber connector subassembly would, in turn, be mounted within a connector housing to form a multifiber connector, such as an SC DC connector or the like.

The multifiber ferrule 12 defines a plurality of bores 18 for receiving respective end portions of a plurality of optical fibers. While the portion of the ferrule illustrated in FIG. 1 includes only a single bore, the multifiber ferrule typically has 2, 4 or 8 bores depending upon the application. While the ferrule of the illustrated embodiment has a generally cylindrical external shape, such as the generally cylindrical shape of a DC ferrule, the multifiber subassembly 10 of the present invention can include ferrules having other configurations, such as generally rectangular ferrules, i.e., MT ferrules. In addition, while the ferrule can be comprised of various materials, the ferrule of one embodiment is formed of heavy glass filled thermoset materials for single mode applications and heavy glass filled thermoplastic materials for multi-mode applications.

Referring again to FIG. 1, the multifiber ferrule 12 has a forward portion that defines the plurality of lengthwise extending bores 18. In addition, the ferrule has a rear portion defining an opening having a predetermined internal shape.

As shown, the opening defined by the rear portion of the ferrule opens through the rear end 12a of the ferrule so as to receive end portions of each of the optical fibers as the ferrule is mounted upon the end portions of the optical fibers. While the opening defined by the rear portion of the ferrule can have a variety of internal shapes, the opening defined by the rear portion of the ferrule depicted by FIG. 1 has a generally stepped configuration in which the lateral cross-sectional size of the opening gradually decreases from a relatively large opening proximate the rear end of the ferrule to a much smaller opening in medial portions of the ferrule.

More particularly, the opening defined by the rear portion of the ferrule 12 of FIG. 1 includes a first cylindrical segment 20 proximate the rear end 12a of the ferrule that has a relatively large diameter. The opening defined by the rear portion of the ferrule also includes a second cylindrical segment positioned forward of the first segment 22 and having a somewhat smaller diameter than the first segment. The opening defined by the rear portion of the ferrule also includes a third tapered segment 24 having generally planar opposed surfaces that taper inwardly in a forwardly extending direction such that the lateral cross-sectional size of the third tapered segment decreases in the forwardly extending direction. The opening defined by the rear portion of the ferrule also includes a fourth segment extending forwardly of the third tapered segment and having opposed planar surfaces that extend in parallel such that the lateral cross-sectional size of the fourth segment remains substantially constant along its length. Finally, the opening defined by the rear portion of the ferrule defines a fifth tapered segment 28 having opposed tapered surfaces that taper inwardly in a forwardly extending direction. Each of the bores 18 defined by the forward portion of the ferrule open into the fifth tapered segment such that optical fibers extending through the opening defined by the rear portion of the ferrule are guided to the plurality of bores defined by the forward portion of the ferrule. While one example of an opening defined by the rear portion of the ferrule is illustrated by the ferrule of FIG. 1, the opening defined by the rear portion of the ferrule can have a variety of other shapes and configurations without departing from the spirit and scope of the present invention.

As also shown in FIG. 1, the multifiber alignment adapter 14 includes an adapter body extending lengthwise between opposed forward and rear ends 14a, 14b. While the adapter body can be formed of a variety of materials, the adapter body of one embodiment is formed of molded plastic. As shown, the forward end of the adapter body is inserted into the opening defined by the rear portion of the ferrule 12. In this regard, at least the forward end of the adapter body has an exterior shape that corresponds to the predetermined internal shape of the opening defined by the rear portion of the ferrule. With respect to the embodiment depicted by FIG. 1, for example, the forward end of the adapter body is beveled at an angle that substantially corresponds to the inwardly tapered walls of the third tapered segment 24 of the opening defined by the rear portion the ferrule. In addition, a forward portion of the adapter body proximate the beveled of forward end has a generally cylindrical exterior shape and is sized to be snuggly received within the second cylindrical segment 22 of the opening defined by the rear portion of the ferrule. By having an exterior surface that is shaped so as to correspond with the predetermined internal shape of the opening defined by the rear portion of the ferrule, the adapter body can be snuggly inserted into the opening defined by the rear portion of the ferrule and can be maintained in a predetermined aligned relationship with respect to the ferrule, as explained in more detail below.

The adapter body also defines a plurality of lengthwise extending passageways 30 for receiving respective optical fibers. Typically, the adapter body defines the same number of passageways as the number of bores 18 defined by the forward portion of the ferrule 12, such as 2, 4 or 8 passageways. As shown in FIG. 1, the passageways defined by the adapter body can be a plurality of lengthwise extending grooves. More particularly, the adapter body of FIG. 1 defines a pair of grooves that open outwardly through opposed lateral sides of the adapter body and that extend lengthwise between the forward and rear ends 14a and 14b of the multifiber alignment adapter. However, the adapter body can define other types of passageways, as described below, without departing from the spirit and scope of the present invention.

According to the present invention, the correspondence between the shape of the exterior surface of the forward portion of the adapter body and the interior shape of the opening defined by the rear portion of the ferrule 12 aligns the multifiber alignment adapter 14 with the ferrule and, more particularly, aligns each passageway 30 of the adapter body with a respective bore 18 of the ferrule. In this regard, each bore defined by the ferrule has a lengthwise extending axis. Likewise, each passageway defined by the adapter body has a lengthwise extending axis. As such, each passageway of the adapter body is preferably aligned with the respective bore of the ferrule such that the lengthwise extending axis of each passageway is collinear with the lengthwise extending axis of the respective bore of the ferrule. In this fashion, individual optical fibers can be guided through respective passageways defined by the adapter body and into respective bores defined by the forward portion of the ferrule in a relatively simple and efficient manner while reducing the opportunities for the optical fiber to be stubbed or otherwise damaged. As a result, the multifiber connector subassembly 10 of the present invention can be readily mounted on a plurality of individual optical fibers without requiring the optical fibers to be ribbonized as required by many conventional connectorization techniques.

As also shown in FIG. 1, the multifiber connector subassembly 10 can include a cylindrical lead-in tube 16 that is inserted into the opening defined by the rear portion of the ferrule 12 and that surrounds or encircles at least a portion of the multifiber alignment adapter 14. As such, the lead-in tube retains the plurality of optical fibers in respective passageways 30 defined by the multifiber alignment adapter. As shown in FIG. 1, the lead-in tube is preferably sized to be snuggly received within the first cylindrical segment 22 of the opening defined by the rear portion of the ferrule. As also shown in FIG. 1, the exterior surface of the adapter body of the multifiber alignment adapter can have a stepped configuration such that the forward portion of the adapter body proximate the forward end 14a is smaller in lateral cross-section than the rear portion of the adapter body 14b proximate the rear end. In this regard, the smaller forward portion of the adapter body can extend forwardly beyond the lead-in tube so as to be snuggly received within the second cylindrical segment 22 of the opening defined by the rear portion of the ferrule. However, the larger rear portion of the adapter body can be sized to be snuggly received within the lead-in tube.

As illustrated, the multifiber alignment adapter 14 is an elongate structure that is sized such that the rear end 14b of the multifiber alignment adapter extends rearwardly beyond the lead-in tube 16 and the other connector hardware, such as a spring and a spring keeper, that is assembled to form a multifiber connector. As such, the rear portion of the multifiber alignment adapter can be grasped as a handle by the technician in order to insert the forward end of the multifiber alignment adapter through the lead-in tube and the other connector hardware and into the opening defined by the rear portion of the ferrule.

Figures 3, 4B:
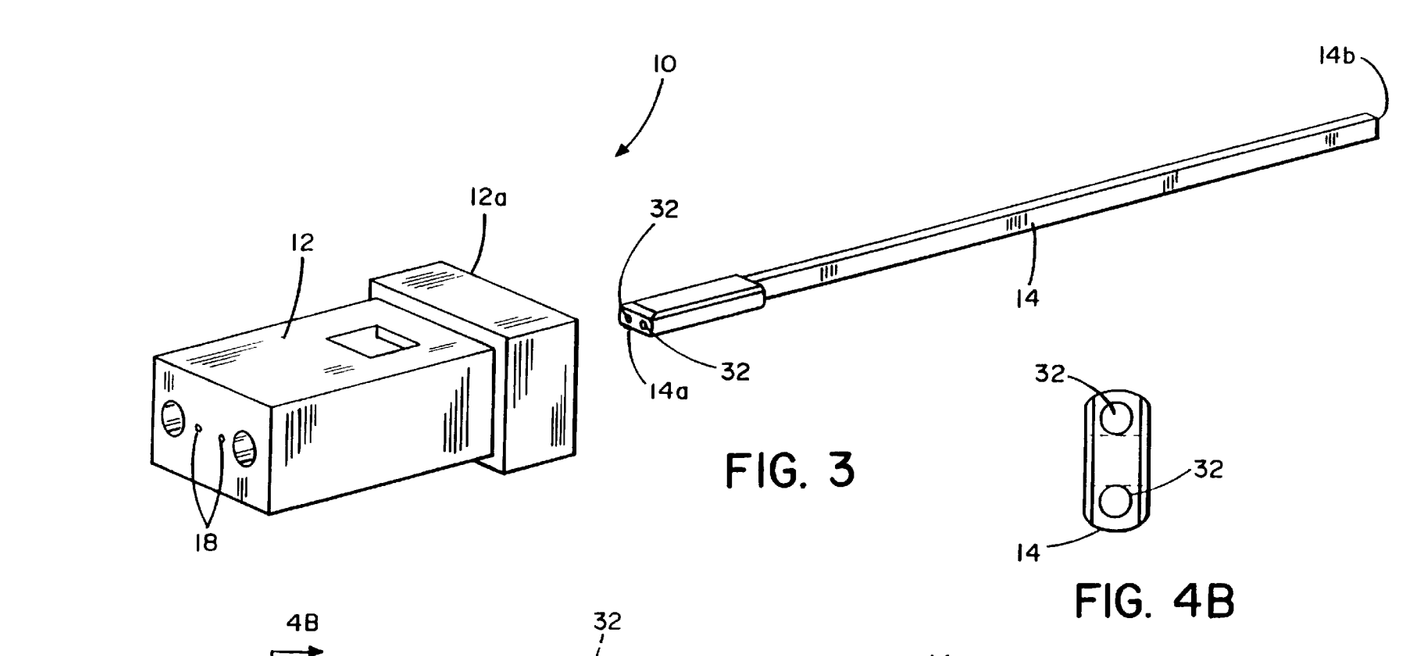
FIG. 3 is an exploded perspective view of a multifiber connector subassembly according to another embodiment of the present invention.
FIGS. 4a and 4b are a plan view and an end view of the multifiber alignment adapter illustrated in FIG. 3.
Figure 5:
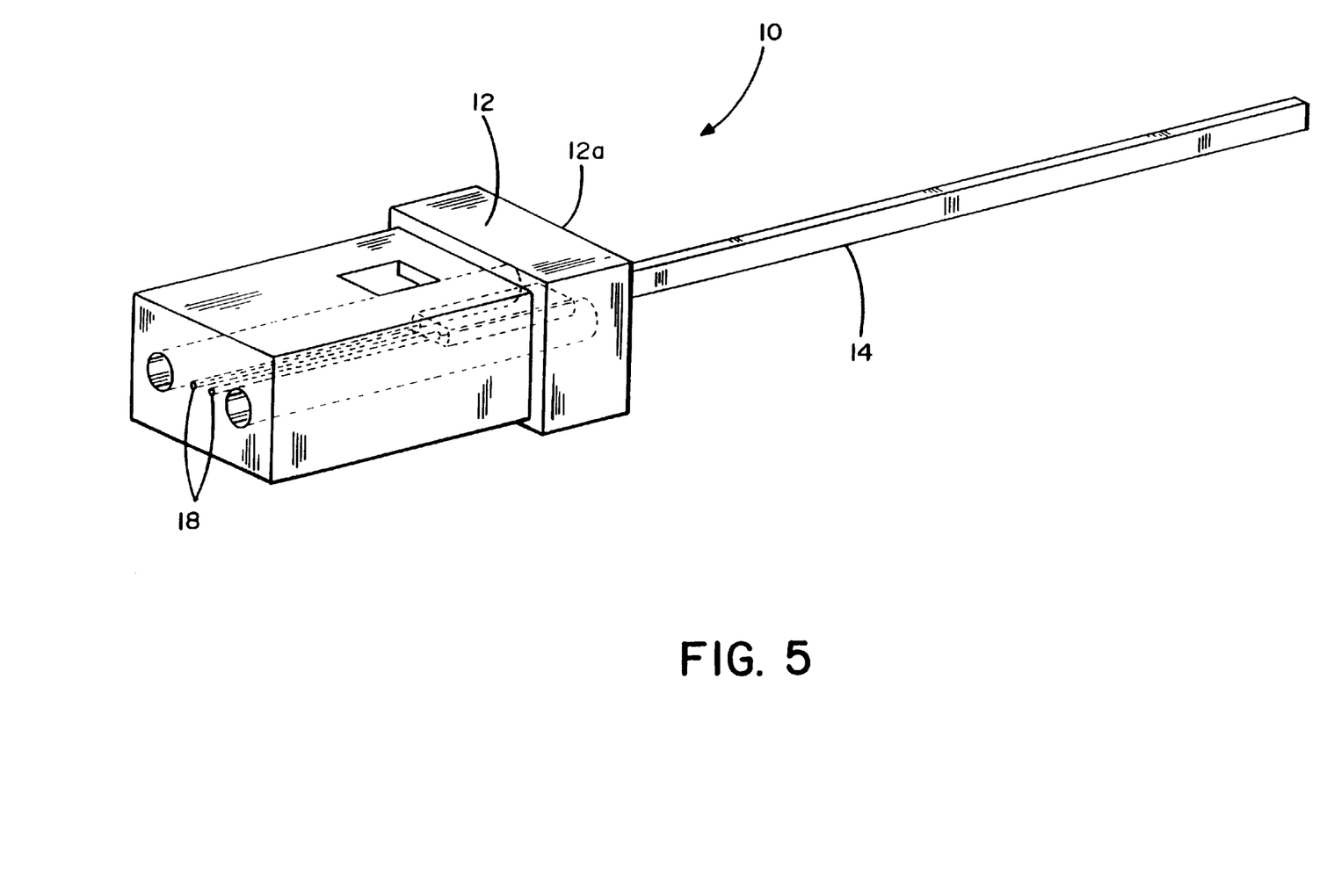
FIG. 5 is a perspective view of the multifiber connector subassembly of FIG. 3 following insertion of a forward end of the multifiber alignment adapter into an opening defined by a rear portion of the multifiber ferrule in which the internal features of the multifiber ferrule and the multifiber alignment adapter are depicted by dashed lines.

A multifiber connector subassembly 10 according to another embodiment is depicted in FIG. 3. As shown, the multifiber ferrule 12 of this embodiment has a generally rectangular shape, such as an MT ferrule. As described above in conjunction with the substantially cylindrical ferrule of FIG. 1, the multifiber ferrule of FIG. 3 has a forward portion that defines a plurality of bores 18 and a rear portion that defines an opening that opens through the rear end 12a of the ferrule. The multifiber connector subassembly of FIG. 3 also includes a multifiber alignment adapter 14 having an adapter body extending lengthwise between opposed forward and rear ends. As described above in conjunction with the embodiment of FIG. 1, at least the forward end 14a of the adapter body is shaped to correspond to the predetermined internal shape of the opening defined by the rear portion of the ferrule. As such, the forward end of the adapter can be inserted into the opening defined by the rear portion of the ferrule. See FIG. 5. For example, the forward portion of the adapter body of one embodiment has a generally rectangular shape in lateral cross-section so as to correspond with a generally rectangular opening defined by the rear portion of the ferrule. As such, the generally rectangular forward portion of the adapter body can be inserted into and snuggly received within the generally rectangular opening defined by the rear portion of the ferrule, as shown in FIG. 5. Accordingly, the forward portion of the adapter body can be maintained in a predetermined aligned relationship with respect to the ferrule, as described below.

Figure 4A:
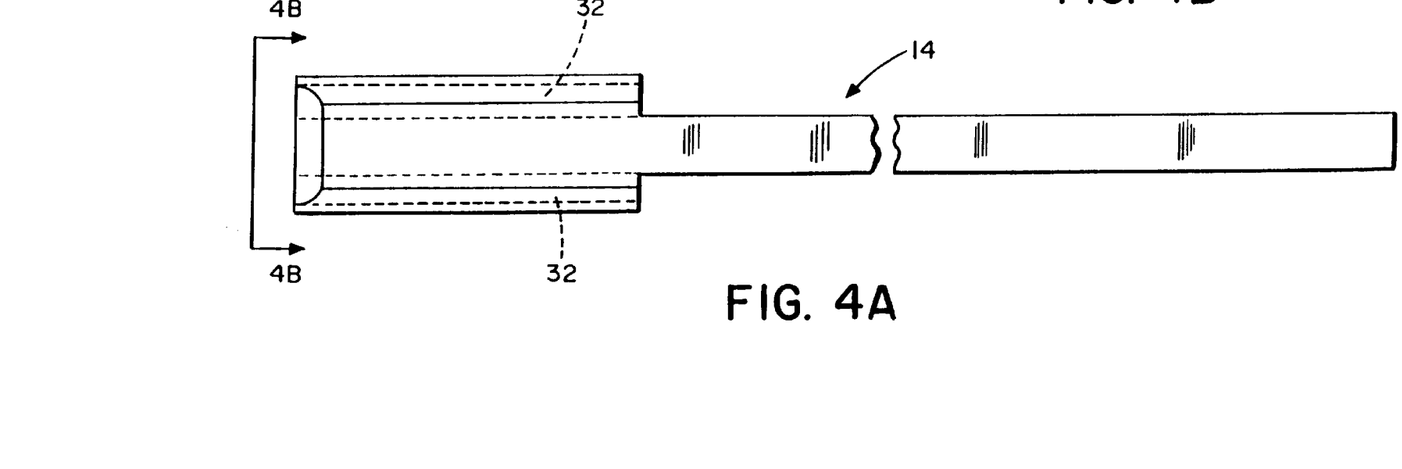

The forward portion of the adapter body also defines a plurality of lengthwise extending bores 32. As shown in FIGS. 3, 4a and 4b, for example, the forward portion of the adapter body defines a pair of bores extending lengthwise through opposed lateral segments of the forward portion. Once the forward portion of the adapter body is inserted into the opening defined by the rear portion of the ferrule 12, the lengthwise extending bores defined by the adapter body will be maintained in an aligned relationship with the lengthwise extending bores 18 defined by the forward portion of the ferrule. In this regard, each of the bores defined by the adapter body has a respective lengthwise extending axis. Likewise, each of the bores defined by the forward portion of the ferrule has a respective lengthwise extending axis. Once the forward portion of the adapter body has been inserted into the opening defined by the rear portion of the ferrule, the bores defined by the forward portion of the adapter body will therefore be aligned with respect to the bores defined by the forward portion of the ferrule such that the lengthwise extending axis of each bore defined by the adapter body extends collinearly with the lengthwise extending axis of a respective bore defined by the ferrule. Thus, individual optical fibers can be guided through the lengthwise extending bores defined by the forward portion of the adapter body and into corresponding bores defined by the forward portion of the ferrule without requiring that the plurality of individual optical fibers be ribbonized.

As shown in FIGS. 3 and 5, the adapter body also includes an elongate rear portion that extends rearwardly from the forward portion. As best shown in FIG. 4A, the elongate rear portion preferably extends rearwardly from a center section of the forward portion of the adapter body between the pair of lengthwise extending bores 32.

While the elongate rear portion can have a variety of shapes and sizes, the elongate rear portion of one embodiment has a generally rectangular shape in lateral cross-section. As described above in conjunction with the embodiment of FIG. 1, the elongate rear portion of the adapter body can be grasped as a handle by a technician in order to insert the forward portion of the adapter body through the connector hardware and into the opening defined by the rear portion of the ferrule 12.

Figure 6:
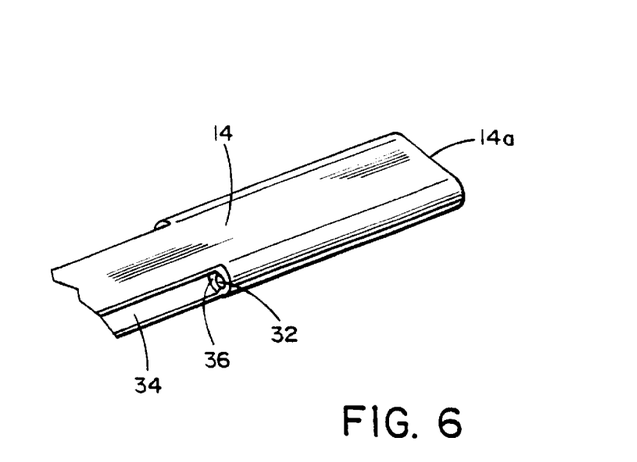
FIG. 6 is a fragmentary perspective view of a multifiber alignment adapter of another embodiment of the present invention.

While the elongate rear portion of the adapter body of the multifiber alignment adapter 14 depicted in FIGS. 3–5 has a rectangular shape in lateral cross-section, the elongate rear portion of the adapter body can define a plurality of lengthwise extending grooves 34 that are aligned with respective ones of the bores 32 defined by the forward portion. As shown in FIG. 6, for example, the lengthwise extending grooves can be defined by the rear portion of the adapter body so as to open outwardly through opposed lateral sides. Accordingly, individual optical fibers can be guided through the grooves defined by the rear portion of the adapter body and into corresponding bores defined by the forward portion of the adapter body. In order to facilitate the insertion of the optical fibers into corresponding bores defined by the forward portion of the adapter body, the forwardmost portion of each groove can include a ramp 36 for funneling the respective optical fiber into the corresponding bore.

Figure 7A:
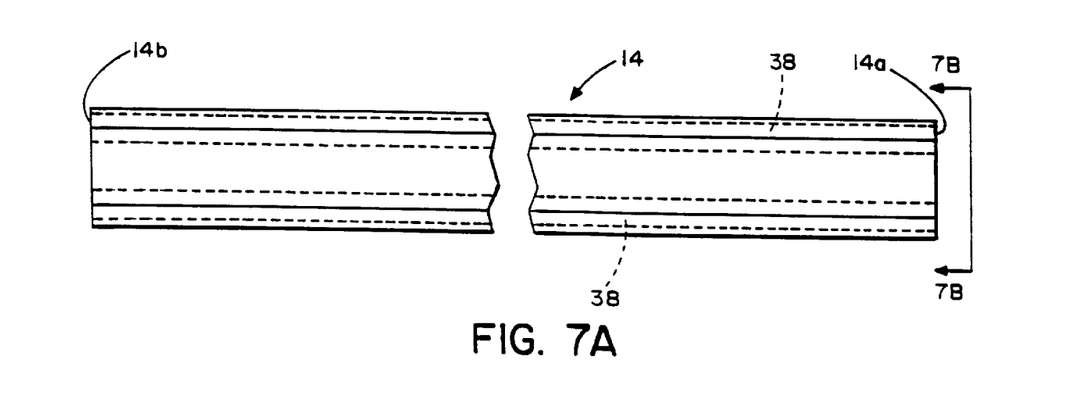
FIGS. 7a and 7b are a plan view and an end view of a multifiber alignment adapter according to yet another embodiment of the present invention.
Figure 7B:
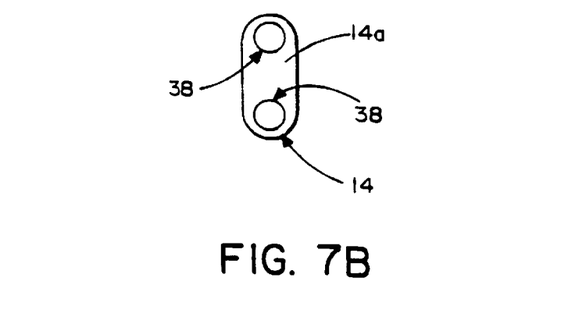

Although various embodiments of the multifiber alignment adapter 14 have been described and illustrated hereinabove, the multifiber alignment adapter can have a variety of other configurations without departing from the spirit and scope of the present invention. For example, a multifiber alignment adapter according to another embodiment is illustrated in FIGS. 7a and 7b. As shown, the multifiber alignment adapter of this embodiment includes an adapter body having uniform cross-sectional shape and size along its entire length. In addition, the adapter body of this embodiment defines a plurality of bores 38 extending lengthwise from the forward end 14a of the adapter body to the opposed rear end 14b of the adapter body for receiving respective end portions of the plurality of optical fibers. As described above in conjunction with other embodiments of the multifiber alignment adapter, the multifiber alignment adapter of this embodiment is sized and shaped to be received within a correspondingly sized and shaped opening defined by the rear portion of a ferrule 12 such that the bores defined by the adapter body are aligned with corresponding bores defined by the forward portion of the ferrule, thereby permitting individual optical fibers to be inserted through respective bores defined by the adapter body and, in turn, into respective bores defined by the forward portion of the ferrule in a relatively straightforward manner.

Although the multifiber alignment adapter 14 of the present invention is capable of guiding a plurality of individual optical fibers into alignment with corresponding bores 18 defined by a multifiber ferrule 12, a multifiber ferrule is also provided according to one aspect of the present invention that includes internal features to guide a plurality of individual optical fibers into the relatively small bores defined by the forward portion of the ferrule. See FIGS. 8–11. While a ferrule having a substantially cylindrical shape is illustrated, the multifiber ferrule of this embodiment can have a variety of other configurations, including a substantially rectangular configuration, without departing from the spirit and scope of the present invention.

According to this aspect of the present invention, the multifiber ferrule 12 includes a ferrule body that defines a plurality of bores, each of which has at least a portion 18a that is smoothly tapered, such as in a conical fashion. In this regard, at least a portion of each bore is smoothly tapered such that the dimensions of the tapered portion of the bore decrease in a forwardly extending direction, i.e., in a direction extending from the rear end 12a of the ferrule body toward the forward end 12b of the ferrule body. As such, the tapered portion of each bore can guide the end portion of the respective optical fiber through the bore as the end portion of the optical fiber is advanced toward the forward end of the ferrule body.

Figure 8:
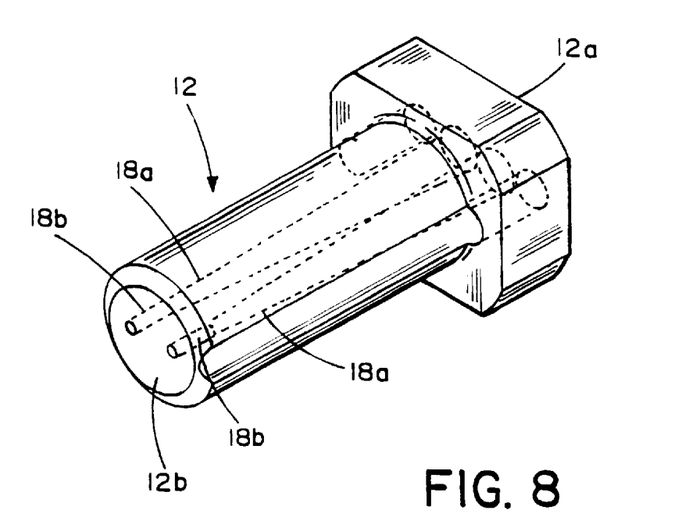
FIG. 8 is a perspective view of a multifiber ferrule according to one embodiment of the present invention in which internal features of the multifiber ferrule are depicted by dashed lines for purposes of illustration.
Figure 9:
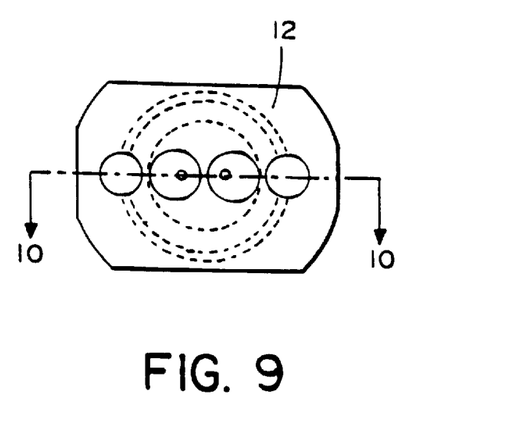
FIG. 9 is an end view of the multifiber ferrule of FIG. 8 taken from the rear end of the multifiber ferrule.
Figure 10:
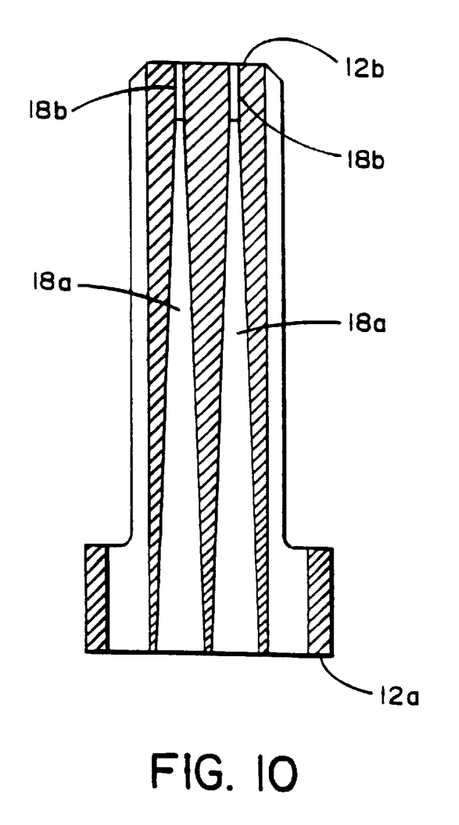
FIG. 10 is a cross-sectional view of the multifiber ferrule of FIGS. 8 and 9 taken along line 10—10 of FIG. 9.

As shown in FIGS. 8 and 10, each bore also includes a first cylindrical portion 18b proximate the forward end 12b of the ferrule body. In particular, each bore preferably includes a first cylindrical portion extending from the forward end of the ferrule body to the tapered portion 18a. As such, the forwardmost end of the tapered portion of the bore preferably has a size and shape that matches the size and shape of the first cylindrical portion. While the first cylindrical portion can have a variety of lengths, the first cylindrical portion generally has a length of at least one millimeter in order to securely position the end portion of the optical fiber relative to the forward end of the ferrule. In addition, the diameter of the first cylindrical portion of the bore typically approximates the outer diameter of the optical fiber such that the optical fiber will be snuggly received within the first cylindrical portion of the bore.

As shown in FIG. 10, the tapered portion 18a of each bore can extend rearwardly to the rear end 12a of the ferrule 12 to define a respective inlet. As a result of the outward tapering of the tapered portion in a rearwardly extending direction, the inlet of each bore is relatively large such that the end portion of the respective optical fiber can be easily inserted therein. See FIG. 9. Upon further inserting the optical fiber into the bore, however, the tapered portion will guide the optical fiber into the relatively small first cylindrical portion 18b that secures the optical fiber in a precise portion relative to the forward end 12b of the ferrule.

Figure 11:
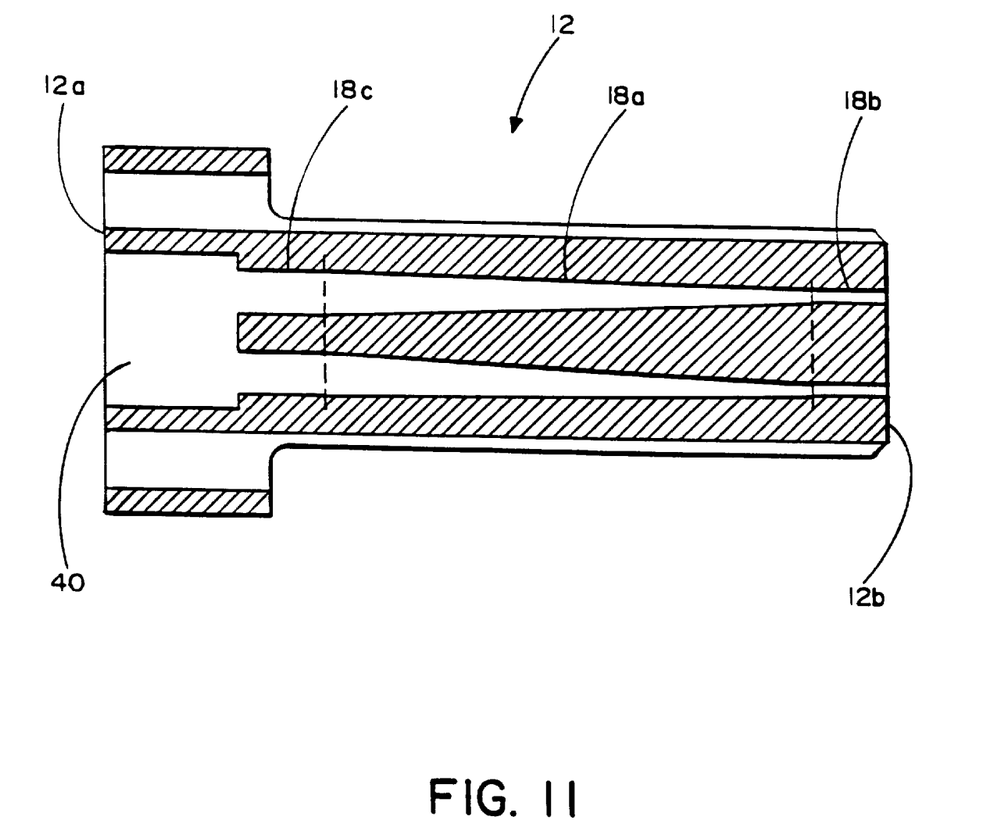
FIG. 11 is a cross-sectional view of a multifiber ferrule according to another embodiment of the present invention.

The tapered portion 18a of each bore need not extend to the rear end 12a of the ferrule 12. Instead, each bore can also include a second cylindrical portion 18c extending rearwardly from the tapered portion as shown in FIG. 11. As such, the tapered portion preferably tapers outwardly in a rearwardly extending direction to a lateral cross-sectional size that matches the size of the second cylindrical portion. As shown in FIG. 11, the second cylindrical portion is significantly larger than the first cylindrical portion such that an optical fiber can be relatively easily inserted into the second cylindrical portion of a bore and thereafter guided through the tapered portion into the relatively small first cylindrical portion of the bore without stubbing or otherwise damaging the end portion of the optical fiber.

As also shown in FIG. 1, the bores need not extend to the rear end 12a of the ferrule 12. Instead, the ferrule can define a common opening 40 into which each of the bores open. The common opening is disposed proximate the rear end of the ferrule such that end portions of each of the optical fibers can be inserted into the common opening and thereafter individually inserted into a respective bore.

As described above, the various embodiments of the multifiber ferrule 12 of this aspect of the present invention can also simplify the process of inserting the plurality of individual optical fibers into the respective bores 18 defined by the ferrule without stubbing or otherwise damaging the optical fibers and without having to ribbonize the plurality of optical fibers as required by many conventional connectorization techniques.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A multifiber connector subassembly comprising:
   a ferrule having forward and rear portions, wherein the forward portion of said ferrule defines a plurality of bores for receiving respective end portions of a plurality of optical fibers, and wherein the rear portion of said ferrule defines an opening having a predetermined shape; and
   a multifiber alignment adapter having a forward end disposed within the opening defined by the rear portion of said ferrule, wherein said multifiber alignment adapter defines a plurality of lengthwise extending passageways for receiving respective ones of the plurality of optical fibers,
   wherein at least the forward end of said multifiber alignment adapter has an exterior shape that corresponds to the predetermined shape of the opening defined by the rear portion of said ferrule to thereby position the forward end of said multifiber alignment adapter within the opening defined by the rear portion of said ferrule such that each passageway of said multifiber alignment adapter is aligned with a respective bore of said ferrule to facilitate insertion of an optical fiber into the respective bore.

2. A multifiber connector subassembly according to claim 1 wherein each bore defined by said ferrule has a lengthwise extending axis, wherein each passageway defined by said multifiber alignment adapter has a lengthwise extending axis, and wherein each passageway of said multifiber alignment adapter is aligned with a respective bore of said ferrule such that the lengthwise extending axis of each passageway extends collinearly with the lengthwise extending axis of the respective bore of said ferrule.

3. A multifiber connector subassembly according to claim 1 wherein the plurality of passageways defined by said multifiber alignment adapter comprise a plurality of lengthwise extending grooves.

4. A multifiber connector subassembly according to claim 3 wherein the grooves defined by said multifiber alignment adapter open outwardly through opposed lateral sides thereof.

5. A multifiber connector subassembly according to claim 1 wherein said multifiber alignment adapter comprises an adapter body extending lengthwise between opposed forward and rear ends, said adapter body including a forward segment proximate the forward end that defines a plurality of lengthwise extending bores for receiving respective one of the plurality of optical fibers.

6. A multifiber connector subassembly according to claim 5 wherein said adapter body further comprises an elongate rear portion extending rearwardly from the forward segment of said adapter body.

7. A multifiber connector subassembly according to claim 1 wherein said multifiber alignment adapter has an exterior surface having a stepped configuration such that a forward portion of said multifiber alignment adapter proximate the forward end is smaller in lateral cross-section than a rear portion of said multifiber alignment adapter proximate the rear end.

8. A multifiber connector subassembly according to claim 1 further comprising a lead in tube having a first end inserted into the opening defined by the rear portion of said ferrule, said lead in tube at least partially surrounding said multifiber alignment adapter.

9. A multifiber alignment adapter capable of guiding a plurality of optical fibers into respective bores defined by a ferrule, the multifiber alignment adapter comprising:
   an adapter body extending lengthwise between opposed forward and rear ends, said adapter body including a forward portion proximate the forward end that defines a plurality of lengthwise extending bores, said adapter body also including an elongate rear portion extending rearwardly from the forward portion,
   wherein at least the forward end of said adapter body is shaped to correspond to an opening defined by a rear portion of the ferrule, and wherein the forward end of said adapter body is therefore capable of being inserted into the opening defined by the ferrule such that each bore of said adapter body will be aligned with a respective bore defined by the ferrule, thereby facilitating insertion of optical fibers into respective bores defined by the ferrule.

10. A multifiber alignment adapter according to claim 9 wherein the elongate rear portion defines a plurality of lengthwise extending grooves aligned with respective ones of the bores defined by the forward portion.

11. A multifiber alignment adapter according to claim 10 wherein the grooves defined by the rear portion of said adapter body open outwardly through opposed lateral sides of said adapter body.

12. A multifiber alignment adapter according to claim 9 wherein the forward portion of said adapter body has a generally rectangular shape in lateral cross-section to thereby facilitate insertion of the forward end of said adapter body into an opening defined by the ferrule that also has a generally rectangular shape.

13. A multifiber alignment adapter capable of guiding a plurality of optical fibers into respective bores defined by a ferrule, the multifiber alignment adapter comprising:
   an adapter body extending lengthwise between opposed forward and rear ends, said adapter body defining a plurality of lengthwise extending passageways for receiving respective end portions of a plurality of optical fibers, said adapter body also including an exterior surface having a stepped configuration such that a forward portion of said adapter body proximate the forward end is smaller in lateral cross-section than a rear portion of said adapter body proximate the rear end,
   wherein at least the forward end of said adapter body is shaped to correspond to an opening defined by a rear portion of the ferrule, and wherein the forward end of said adapter body is therefore capable of being inserted into the opening defined by the ferrule such that each passageway defined by said adapter body will be aligned with a respective bore defined by the ferrule, thereby facilitating insertion of optical fibers into respective bores defined by the ferrule.

14. A multifiber alignment adapter according to claim 13 wherein the plurality of passageways defined by said adapter body comprise a plurality of grooves that extend lengthwise between the forward and rear ends of said adapter body.

15. A multifiber alignment adapter according to claim 14 wherein the grooves defined by said adapter body open outwardly through opposed lateral sides of said adapter body.

16. A multifiber alignment adapter according to claim 13 wherein the forward end of said adapter body is beveled to thereby facilitate insertion of the forward end of said adapter body into an opening defined by the ferrule that is correspondingly beveled.

17. A multifiber ferrule comprising:

a ferrule body extending lengthwise between opposed forward and rear ends, said ferrule body defining a plurality of bores for receiving respective end portions of a plurality of optical fibers, wherein the plurality of bores defined by said ferrule body open through the forward end of said ferrule body such that the end portions of the optical fibers will thereby be exposed, wherein at least a portion of each bore is smoothly tapered such that the dimensions of the tapered portion of the bore decrease in a direction extending from the rear end of said ferrule body toward the forward end of said ferrule body, wherein each bore also includes a first cylindrical portion extending from the forward end of said ferrule body to the tapered portion, and wherein the tapered portion tapers inwardly in a forwardly extending direction to a lateral cross-sectional size that matches the first cylindrical portion in lateral cross-section to thereby permit the tapered portion of each bore to guide the end portion of a respective optical fiber through the bore and into the first cylindrical portion as the end portion of the optical fiber is advanced toward the forward end of said ferrule body.

18. A multifiber ferrule according to claim 17 wherein each bore further includes a second cylindrical portion extending rearwardly from the tapered portion, and wherein the tapered portion tapers outwardly in a rearwardly extending direction to a lateral cross-sectional size that matches the second cylindrical portion in lateral crosssection section such that the second cylindrical portion is larger in lateral cross-section than the first cylindrical portion.

19. A multifiber ferrule according to claim 17 wherein said ferrule body further defines a common opening proximate the rear end of said ferrule body, and wherein each of the bores defined by said ferrule body opens into the common opening such that each of the plurality of optical fibers can extend through the common opening defined by said ferrule body and into a respective bore.

* * * * *

UNITED STATES PATENT AND TRADEMARK OFFICE
CERTIFICATE OF CORRECTION

PATENT NO. : 6,305,850 B1
DATED : October 23, 2001
INVENTOR(S) : James P. Luther and Karl M. Wagner It is certified that error appears in the above-identified patent and that said Letters Patent is hereby corrected as shown below:

Column 11,
Line 64, delete "portion", and add -- segment --.

Signed and Sealed this

Sixth Day of August, 2002

Attest:

JAMES E. ROGAN
Attesting Officer     Director of the United States Patent and Trademark Office